United States Patent
Sung et al.

(10) Patent No.: US 7,944,498 B2
(45) Date of Patent: May 17, 2011

(54) MULTI-FOCAL CAMERA APPARATUS AND METHODS AND MEDIUMS FOR GENERATING FOCUS-FREE IMAGE AND AUTOFOCUS IMAGE USING THE MULTI-FOCAL CAMERA APPARATUS

(75) Inventors: Gee-young Sung, Daegu (KR);
Heui-keun Choh, Seongnam-si (KR);
Du-sik Park, Suwon-si (KR);
Young-ran Han, Suwon-si (KR);
Yun-tae Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 678 days.

(21) Appl. No.: 11/892,648

(22) Filed: Aug. 24, 2007

(65) Prior Publication Data

US 2008/0079839 A1 Apr. 3, 2008

(30) Foreign Application Priority Data

Oct. 2, 2006 (KR) ........................ 10-2006-0097337

(51) Int. Cl.
*G03B 13/00* (2006.01)
*H04N 5/232* (2006.01)
*H04N 5/225* (2006.01)
*H04N 5/208* (2006.01)
*G02B 13/16* (2006.01)
*G06K 9/40* (2006.01)

(52) U.S. Cl. ......... 348/345; 348/252; 348/335; 382/264
(58) Field of Classification Search .................. 348/252, 348/335; 382/264

See application file for complete search history.

(56) References Cited

U.S. PATENT DOCUMENTS

| | | | | |
|---|---|---|---|---|
| 5,488,674 A | * | 1/1996 | Burt et al. | 382/284 |
| 6,148,113 A | * | 11/2000 | Wolverton et al. | 382/255 |
| 6,201,899 B1 | * | 3/2001 | Bergen | 382/284 |
| 7,460,167 B2 | * | 12/2008 | Schoonmaker et al. | 348/360 |
| 7,561,191 B2 | * | 7/2009 | May et al. | 348/240.2 |

(Continued)

FOREIGN PATENT DOCUMENTS

JP  11-311832  11/1999

(Continued)

OTHER PUBLICATIONS

Kubota, et al., Reconstructing Arbitrarily Focused Images From Two Differently Focused Images Using Linear Filters, Nov. 2005, IEEE Transaction on Image Processing, vol. 14, No. 11, pp. 1848-1859.*
Korean Patent Office Action dated Sep. 28, 2007, issued in corresponding Patent Application No. 10-2006-0097337.

*Primary Examiner* — Lin Ye
*Assistant Examiner* — Chia-Wei A Chen
(74) *Attorney, Agent, or Firm* — Staas & Halsey LLP (57) ABSTRACT

A multi-focal camera apparatus and methods and mediums for generating a focus-free image and an autofocus image using the multi-focal camera apparatus are provided. The multi-focal camera apparatus includes a lens module which comprises a plurality of lenses that concentrate light incident thereupon, and an image-sensor module which comprises a plurality of sensing zones respectively corresponding to the lenses, and obtains a plurality of images by converting beams of light that transmit through the lenses into electrical signals using the sensing zones, wherein the lenses have the same optical properties and are different distances apart from the respective sensing zones.

9 Claims, 10 Drawing Sheets
(6 of 10 Drawing Sheet(s) Filed in Color)

U.S. PATENT DOCUMENTS

| | | | |
|---|---|---|---|
| 2003/0020814 A1* | 1/2003 | Ono | 348/220.1 |
| 2003/0160886 A1* | 8/2003 | Misawa et al. | 348/347 |
| 2004/0032525 A1* | 2/2004 | Aharon | 348/350 |
| 2004/0212738 A1* | 10/2004 | Sheraizin et al. | 348/586 |
| 2004/0240052 A1* | 12/2004 | Minefuji et al. | 359/435 |
| 2008/0151388 A1* | 6/2008 | George et al. | 359/707 |

FOREIGN PATENT DOCUMENTS

| | | |
|---|---|---|
| JP | 2002-281361 | 9/2002 |
| JP | 2005-101874 | 4/2005 |
| KR | 10-2004-0103786 | 12/2004 |
| KR | 10-2006-0014228 | 2/2006 |

* cited by examiner

MULTI-FOCAL CAMERA APPARATUS AND METHODS AND MEDIUMS FOR GENERATING FOCUS-FREE IMAGE AND AUTOFOCUS IMAGE USING THE MULTI-FOCAL CAMERA APPARATUS

CROSS-REFERENCE TO RELATED APPLICATIONS

This application claims the priority benefit of Korean Patent Application No. 10-2006-0097337 filed on Oct. 2, 2006 in the Korean Intellectual Property Office, the disclosure of which is incorporated herein by reference in its entirety.

BACKGROUND OF THE INVENTION

1. Field of the Invention

The present invention relates to a multi-focal camera apparatus and methods and mediums for generating a focus-free image and an autofocus image using the multi-focal camera apparatus, and more particularly to a method, apparatus, and medium for generating a focus-free image and an autofocus image in which a plurality of images having different focal lengths can be captured by performing only one photographing operation, and then a focus-free image and an autofocus image can be generated based on the plurality of images.

2. Description of the Related Art

Due to recent developments in digital technology, digital devices have become light, compact, and slim. Also, with the growing trend to integrate a variety of digital devices, a mobile phone, a digital camera, and an MP3 player can be merged into a single digital device.

In general, the diameter of a lens of a camera phone, which is a mobile phone equipped with a digital camera, is less than that of a digital still camera (DSC). Thus, a camera phone has a wider depth-of-focus (DOF) range than a DSC. Since a typical camera phone has a DOF range between 60 cm and infinity, a relatively clear image of an object can be captured by a camera phone as long as the camera phone is at least 60 cm from the object. However, it is difficult to realize an autofocus function, which is one of the features of high-end digital cameras, in camera phones.

Even though camera phones generally have a relatively wide DOF range, they are likely to render objects other than an object located at a focal point blurry, even when the objects are about 60 cm apart therefrom. Accordingly, it is difficult to obtain focus-free images using camera phones. In addition, even if camera phones have a focal length greater than 60 cm, they are likely to render an object that is located at an object-side focal point with the highest sharpness, and render objects that are in front of or behind the object at the object-side focal point slightly blurry.

SUMMARY OF THE INVENTION

According to an aspect of the present invention, there is provided an apparatus, method, and medium for generating a focus-free image and an autofocus image which can capture a plurality of images having various focal lengths by performing only one photographing operation with the use of a camera phone or a compact digital camera, and can realize a focus-free imaging function and an autofocus imaging function, which are the features of high-end cameras.

According to an aspect of the present invention, there is provided a multi-focal camera apparatus. The multi-focal camera apparatus includes a lens module which comprises a plurality of lenses that concentrate light incident thereupon, and an image-sensor module which comprises a plurality of sensing zones respectively corresponding to the lenses, and which obtains a plurality of images by converting incident light transmitted through the lenses into electrical signals using the sensing zones, wherein the lenses have the same optical properties, and are different distances apart from the respective sensing zones.

According to another aspect of the present invention, there is provided a multi-focal camera apparatus. The multi-focal camera apparatus includes a lens module which comprises a plurality of lenses that concentrate light incident thereupon, and an image-sensor module which comprises a plurality of sensing zones respectively corresponding to the lenses, and which obtains a plurality of images by converting beams of incident light transmitted through the lenses into electrical signals using the sensing zones, wherein the lenses have different optical properties and are the same distance apart from the respective sensing zones.

According to another aspect of the present invention, there is provided a method of generating a focus-free image. The method includes (a) obtaining a plurality of images by performing a photographing operation using a multi-focal camera apparatus including an image-sensor module which comprises a plurality of sensing zones respectively corresponding to the lenses, and which obtains a plurality of images by converting beams of incident light transmitted through the lenses into electrical signals using the sensing zones, (b) performing view-angle correction on the images so that the images are the same size, and (c) generating a focus-free image by extracting image portions with optimum sharpness from the view-angle corrected images and merging the extracted image portions.

According to another aspect of the present invention, there is provided a method of generating an autofocus image. The method includes (a) obtaining a plurality of images by performing a photographing operation using a multi-focal camera apparatus including an image-sensor module which comprises a plurality of sensing zones respectively corresponding to the lenses, and which obtains a plurality of images by converting beams of incident light transmitted through the lenses into electrical signals using the sensing zones, (b) performing view-angle correction on the images so that the images are the same size, and (c) generating an autofocus image by extracting an image portion with optimum sharpness from a predetermined image that is chosen among the images, blurring the view-angle corrected images excluding the predetermined image, and merging a blurry image obtained by the blurring and the extracted image portion.

According to another aspect of the present invention, there is provided a method of generating a focus-free image from a multi-focal camera, the method includes performing view-angle correction on images captured by the multi-focal camera so that the images are the same size; and generating a focus-free image by extracting image portions with optimum sharpness from the view-angle corrected images and merging the extracted image portions.

According to another aspect of the present invention, there is provided a method of generating an autofocus image from a multi-focal camera, the method including performing view-angle correction on images captured by the multi-focal camera so that the images are the same size; and generating an autofocus image by extracting an image portion with optimum sharpness from a predetermined image that is chosen among the view-angle corrected images, blurring the view-angle corrected images excluding the predetermined image, and merging a blurry image obtained by the blurring and the extracted image portion.

According to another aspect of the present invention, the multi-focal camera apparatus may be part of a personal digital assistant or mobile phone.

According to another aspect of the present invention, the multi-focal camera apparatus may be a personal camera-digital assistant or a mobile camera phone.

According to another aspect of the present invention, there is provided at least one computer readable medium storing computer readable instructions to implement methods of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
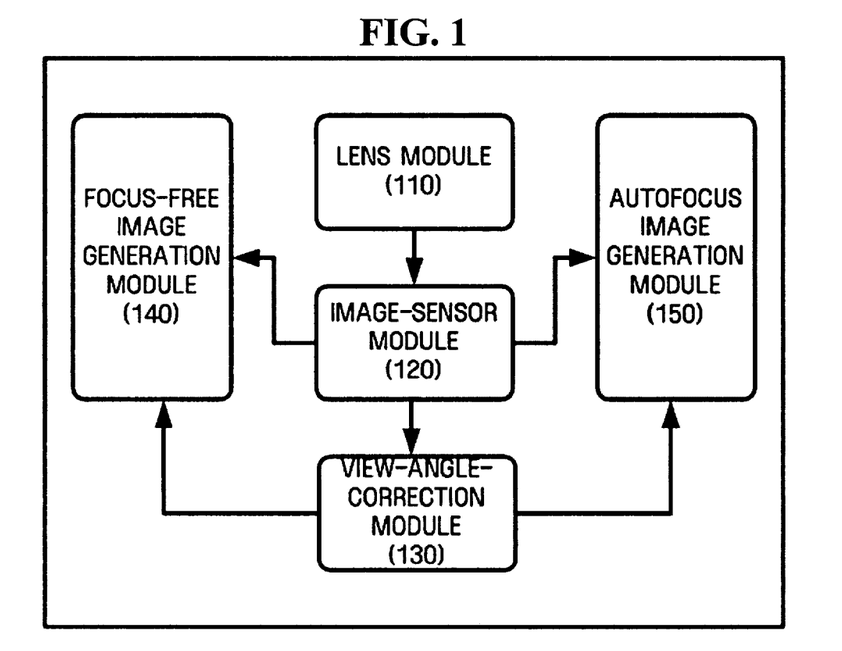
FIG. 1 is a block diagram of a multi-focal camera apparatus according to an exemplary embodiment of the present invention.
Figure 2:
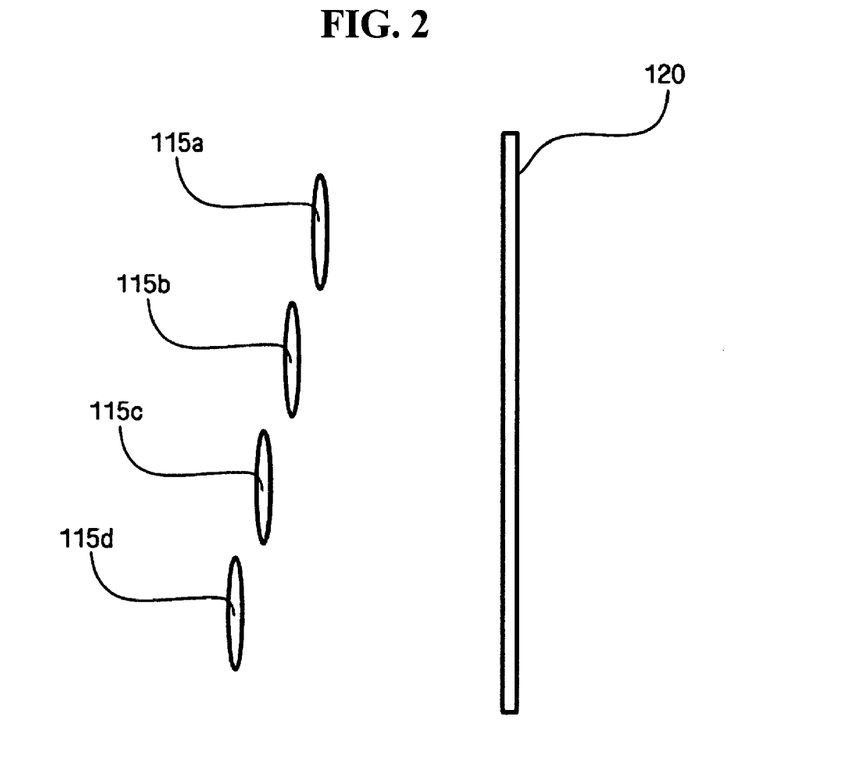
FIG. 2 is a diagram illustrating the arrangement of lenses in a multi-focal camera apparatus when the lenses have the same optical properties.
Figure 3:
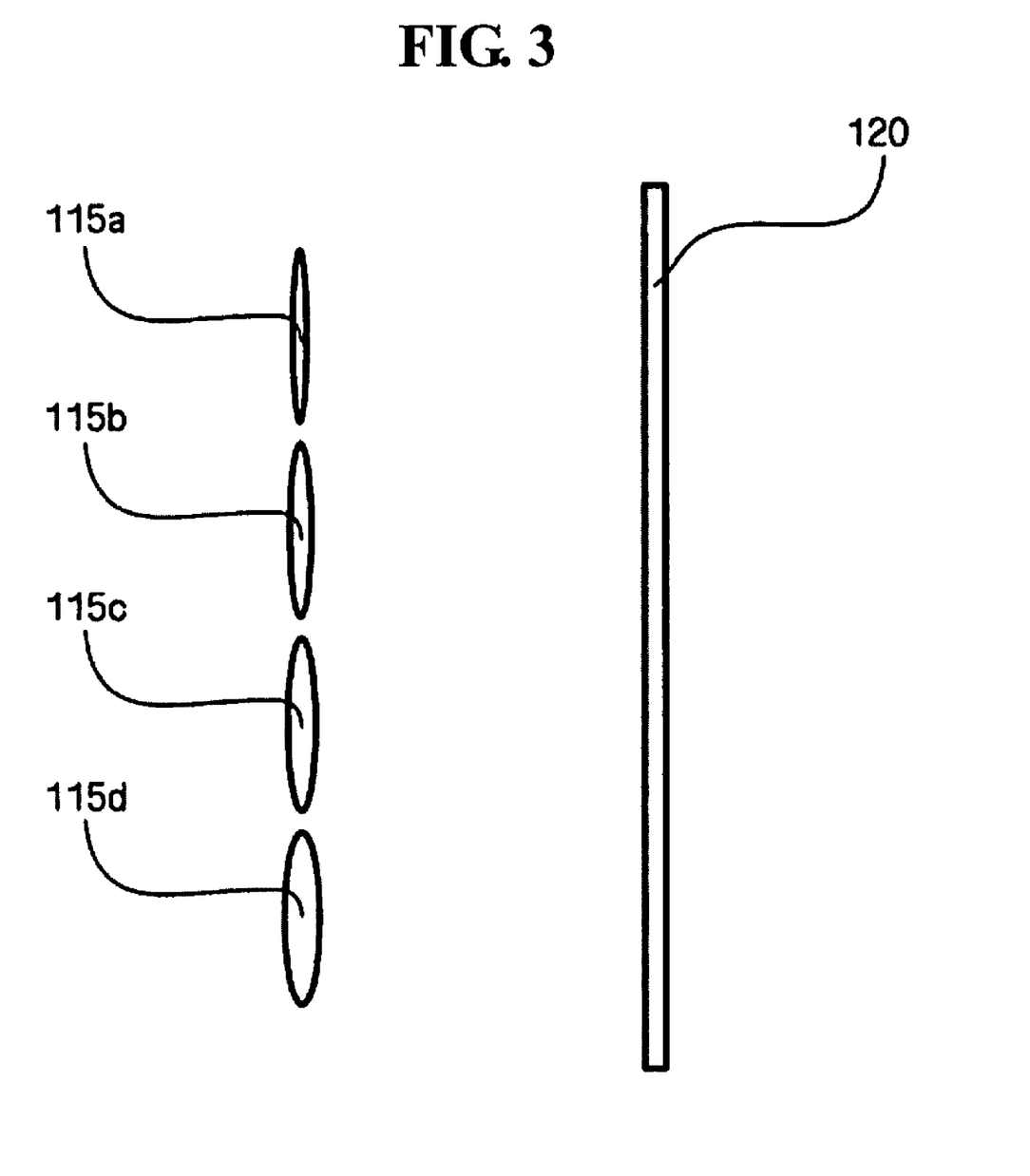
FIG. 3 is a diagram illustrating the arrangement of lenses in a multi-focal camera apparatus when the lenses have different optical properties.
Figure 5:
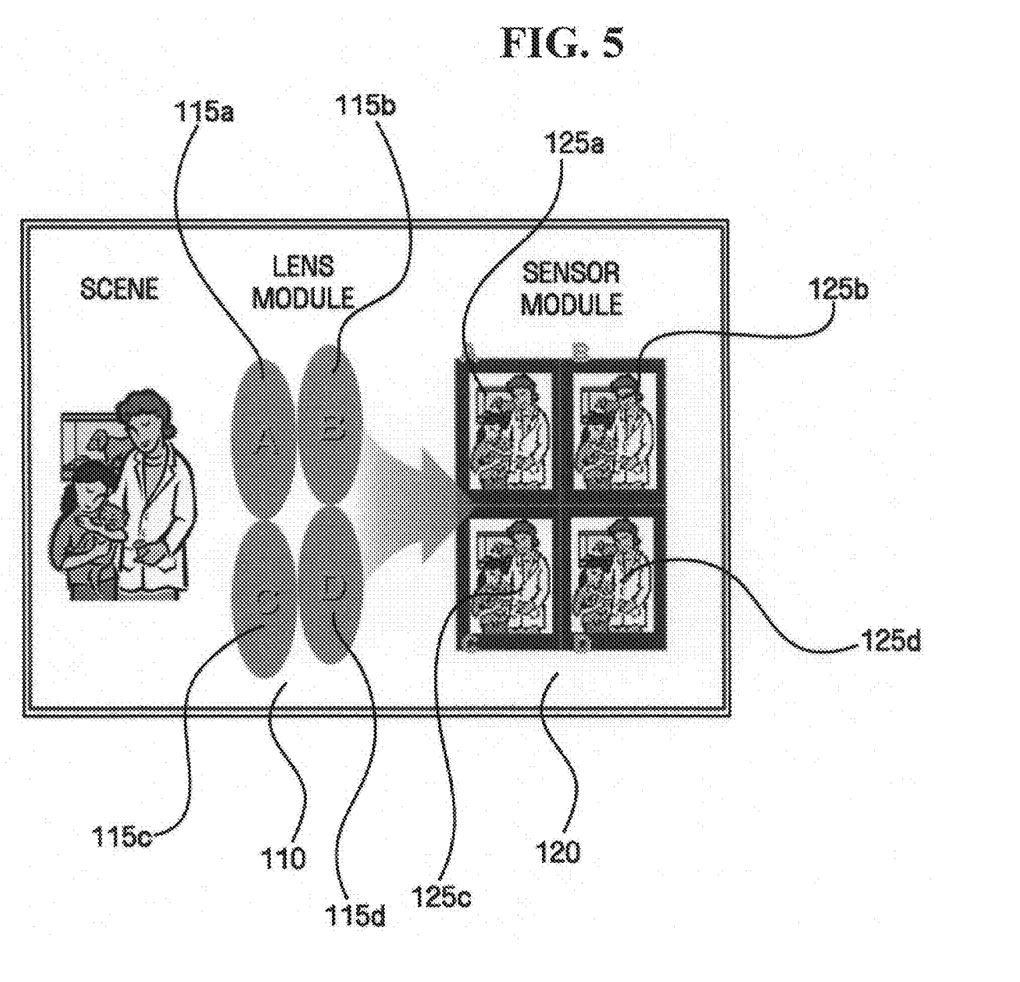
FIG. 5 is a schematic diagram of a multi-focal camera apparatus according to an exemplary embodiment of the present invention.

FIG. 1 is a block diagram of a multi-focal camera apparatus according to an exemplary embodiment of the present invention, FIG. 2 is a diagram for illustrating the arrangement of lenses in a multi-focal camera apparatus when the lenses have the same optical properties, FIG. 3 is a diagram for illustrating the arrangement of lenses in a multi-focal camera apparatus when the lenses have different optical properties and each distance between lens and image-sensor module is same according to another exemplary embodiment of the invention, and FIG. 5 is a schematic diagram of a multi-focal camera apparatus according to an exemplary embodiment of the present invention. Examples of devices containing a multi-focal camera apparatus include a personal digital assistant and mobile phone. The multi-focal camera apparatus may be incorporated into other digital devices.

Referring to FIGS. 1 through 3 and 5, the multi-focal camera apparatus includes a lens module 110, an image-sensor module 120, a view-angle-correction module 130, a focus-free image generation module 140, and an autofocus-image-generation module 150.

The lens module 110 includes a plurality of lenses 115a through 115d that concentrate light. The number of lenses in the lens module 110 is not limited. The lenses 115a through 115d may be arranged in a checkerboard pattern. For example, if the lens module 110 comprises four lenses, then the four lenses may be arranged as a square. However, for convenience, the lenses 115a through 115d are illustrated in FIGS. 2 and 3 as being arranged as a row. For convenience, assume that the lens module 110 includes four lenses, i.e., the lenses 115a through 115d, and that the lenses 115a through 115d are arranged as a row.

If the number of lenses in the lens module 110 is n, a total of n images 125 can be captured by performing only one photographing operation. In this case, one of the lenses 115a through 115d (e.g., the lens 115b) may be used as a reference lens. Then, a user may capture an image of an object by focusing the reference lens 115b on the object.

Figure 4:
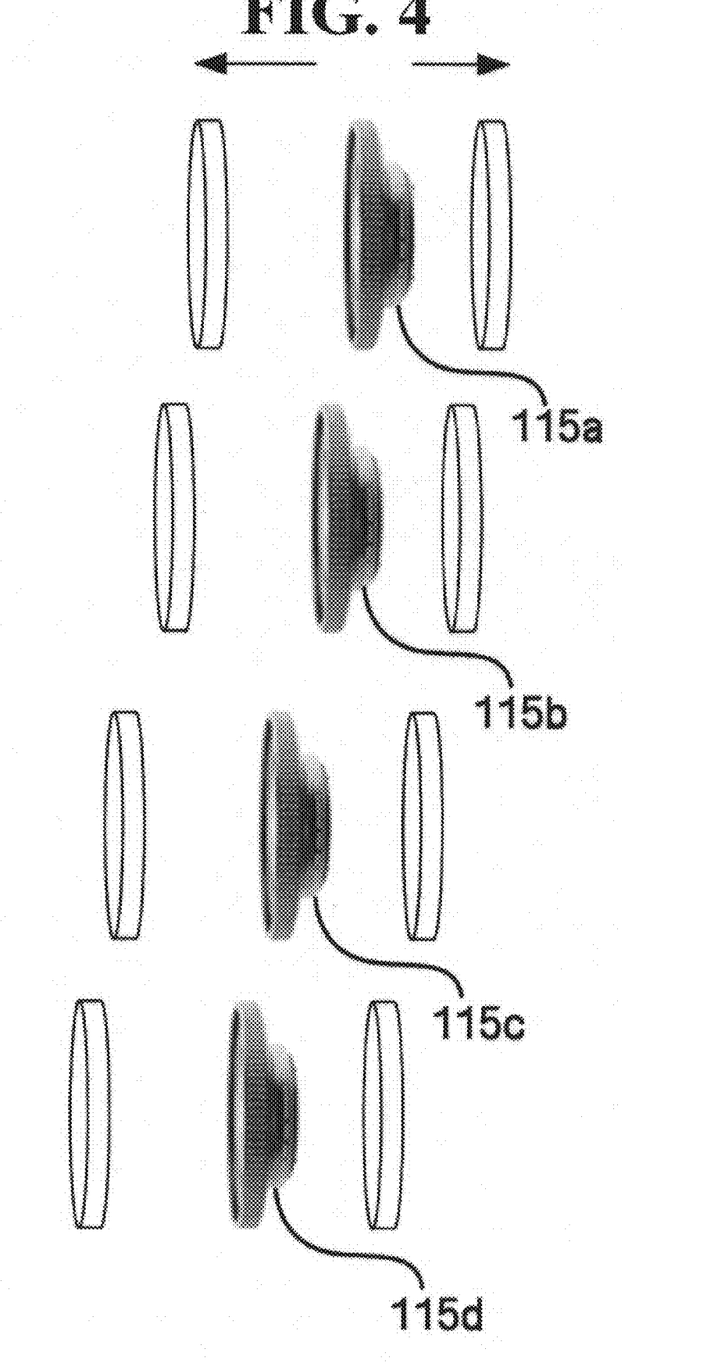
FIG. 4 is a diagram illustrating the lateral movement of a plurality of lenses along with one another.

Referring to FIG. 4, the lenses 115a through 115d can move back and forth along with one another. In detail, when the reference lens 115b moves, the lenses 115a, 115c, and 115d move in the same direction and by the same amount as the reference lens 115b. Alternatively, the lenses 115a through 115d may move independently of one another.

Referring to FIG. 2, if the lenses 115a through 115d have the same optical properties, e.g., if the lenses 115a through 115d have the same focal length, the lenses 115a through 115d may be located different distances apart from respective corresponding sensing zones of the image-sensor module 120. As a result, images that are respectively captured using the lenses 115a, 115c, and 115d focus different locations from an image that is captured using the reference lens 115b because the lenses 115a through 115d are different distances apart from the respective sensing zones of the image-sensor module 120

Referring to FIG. 3, if the lenses 115a through 115d have different optical properties, e.g., different focal lengths, the lenses 115a through 115d may be located the same distance apart from the respective sensing zones of the image-sensor module 120. As a result, images that are respectively captured using the lenses 115a, 115c, and 115d focus different locations from an image that is captured using the reference lens 115b because the lenses 115a through 115d have different focal lengths, even though the lenses 115a through 115d are the same distance apart from the respective sensing zones of the image-sensor module 120.

The image-sensor module 120 senses light incident the lenses 115a through 115d, and converts the results of the sensing into electrical signals, thereby obtaining a plurality of images. The image-sensor module 120 includes a plurality of sensing zones 125a through 125d which respectively corresponding to the lenses 115a through 115d in the lens module 110. Beams of light incident on the lenses 115a through 115d are respectively sensed by the sensing zones 125a through 125d, thereby obtaining a plurality of images.

Referring to FIG. 5, beams of light that are transmitted through lens A (115a), lens B (115b), lens C (115c), and lens D (115d) are respectively sensed by sensing zone A (125a), sensing zone B (125b), sensing zone C (125c), and sensing zone D (125d), thereby obtaining a plurality of images through one photographing operation.

The view-angle-correction module 130 corrects a plurality of images obtained by the image-sensor module 120 so that the images are the same size. Since the lenses 115a through 115d have different locations, a plurality of images captured using the lenses 115a through 115d, respectively, may render the same scene in different sizes. Therefore, view-angle correction is performed on the images captured using the lenses 115a through 115d, respectively, so that the corresponding images are the same size. View-angle correction is well known to one of ordinary skill in the art to which the present invention pertains, and thus, a detailed description thereof will be skipped.

The focus-free image generation module 140 generates a focus-free image based on a plurality of images. In detail, the focus-free image generation module 140 extracts image portions with optimum sharpness from a plurality of images, and merges the extracted image portions together, thereby generating a focus-free image with high sharpness.

The autofocus-image-generation module 150 generates an autofocus image based on a plurality of images. In detail, the autofocus-image-generation module 150 extracts an image portion with optimum sharpness from a predetermined image that is selected among a plurality of images, blurs the plurality of images excluding the predetermined image, and merges blurry images, thereby generating an autofocus image.

The predetermined image may be an image captured using the reference lens 115b. The autofocus image generated by the autofocus-image-generation module 150 clearly renders an object on which the reference lens 115b is focused sharp and clear, and renders other objects not focused by the reference lens 115b blurry.

Figure 6:
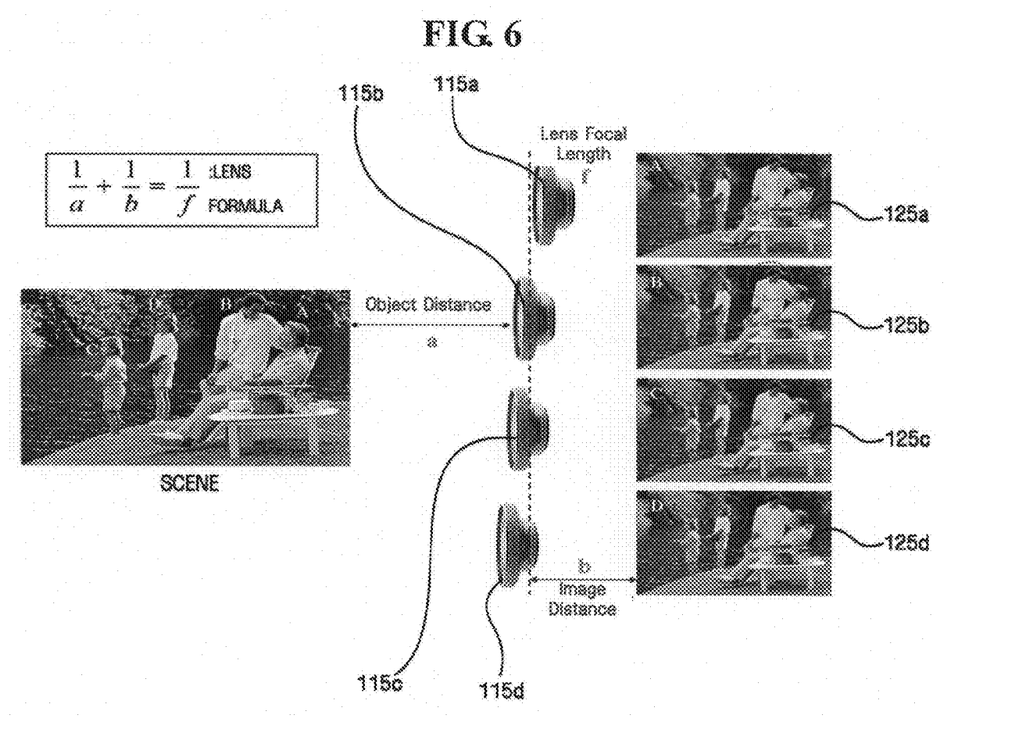
FIG. 6 is a diagram presenting a plurality of images that are captured through one photographing operation and correspond to different lens locations.

FIG. 6 is a diagram presenting a plurality of images that are captured through one photographing operation, and correspond to different lens locations.

An autofocus function of a typical camera is a function of automatically bringing an object into sharp focus by moving a lens back and forth. According to an exemplary embodiment, a similar function to the autofocus function can be provided by a plurality of lenses 115a, 115b, 115c, and 115d which have different focal lengths and can move back and forth along with one another. Therefore, it is possible to obtain a plurality of images having different object focus distances using the lenses 115a, 115b, 115c, and 115d. Object distance is the distance between a lens and an object on which the lens is focused.

For example, referring to FIG. 6, there is a scene of four people, i.e., persons A, B, C, and D. The four people are distant from a camera in the order of A, B, C, and D. A photographing operation is performed by using lens B (115b) as a reference lens and focusing it on person B, thereby obtaining four images 125a, 125b, 125c, and 125d. Since lenses A, B, C, and D (115a, 115b, 115c, and 115d) have different object distances a, the images 125a, 125b, 125c, and 125d obtained using lenses A, B, C, and D (115a, 115b, 115c, and 115d), respectively, correspond to different object distances a. In detail, the image 125a is captured by focusing lens A (115a) on person A who is less distant from the camera than person B, the image 125c is captured by focusing lens C (115c) on person C who is more distant from the camera than person B, and the image 125d is captured by focusing lens D (115d) on person D who is more distant from the camera than person C. Accordingly, persons A, B, C, and D are rendered most vividly in the images 125a, 125b, 125c, and 125d, respectively.

In short, the multi-focal camera apparatus according to the present invention can obtain a plurality of images having different object distances.

Figure 7:
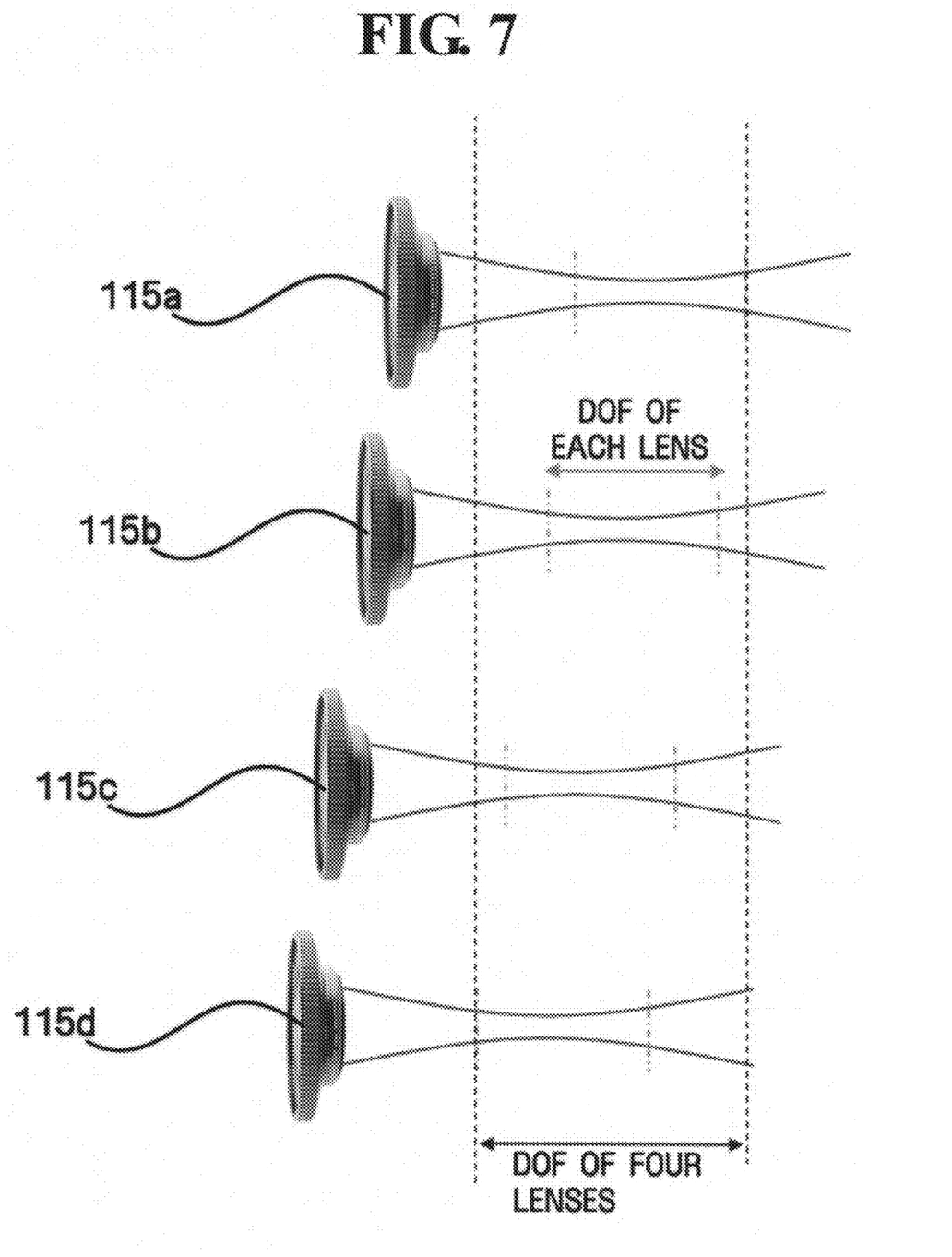
FIG. 7 is a diagram for explaining the expansion of depth of focus (DOF) by a multi-focal camera apparatus according to an exemplary embodiment of the present invention.

FIG. 7 is a diagram for explaining the expansion of depth of focus (DOF) by a multi-focal camera apparatus according to an exemplary embodiment of the present invention. DOF is a focal range, and images formed within this focal range are all proper. FIG. 7 illustrates DOF of each of a plurality of lenses 115a through 115d when the lenses 115a through 115d have the same optical properties, and particularly the same focal length. Since the lenses 115a through 115d have the same optical properties, DOF is formed at the same distance away from each of the lenses 115a through 115d. Therefore, according to an exemplary embodiment, focused image portions are extracted from a plurality of images captured using the lenses 115a through 115d, and the extracted, focused image portions are merged, thereby obtaining an image with high sharpness. Accordingly, it is possible to obtain the same effect of expanding DOF.

A method of generating a focus-free image using a multi-focal camera apparatus according to an exemplary embodiment of the present invention will hereinafter be described in detail with reference to FIGS. 8 and 9.

Figure 8:
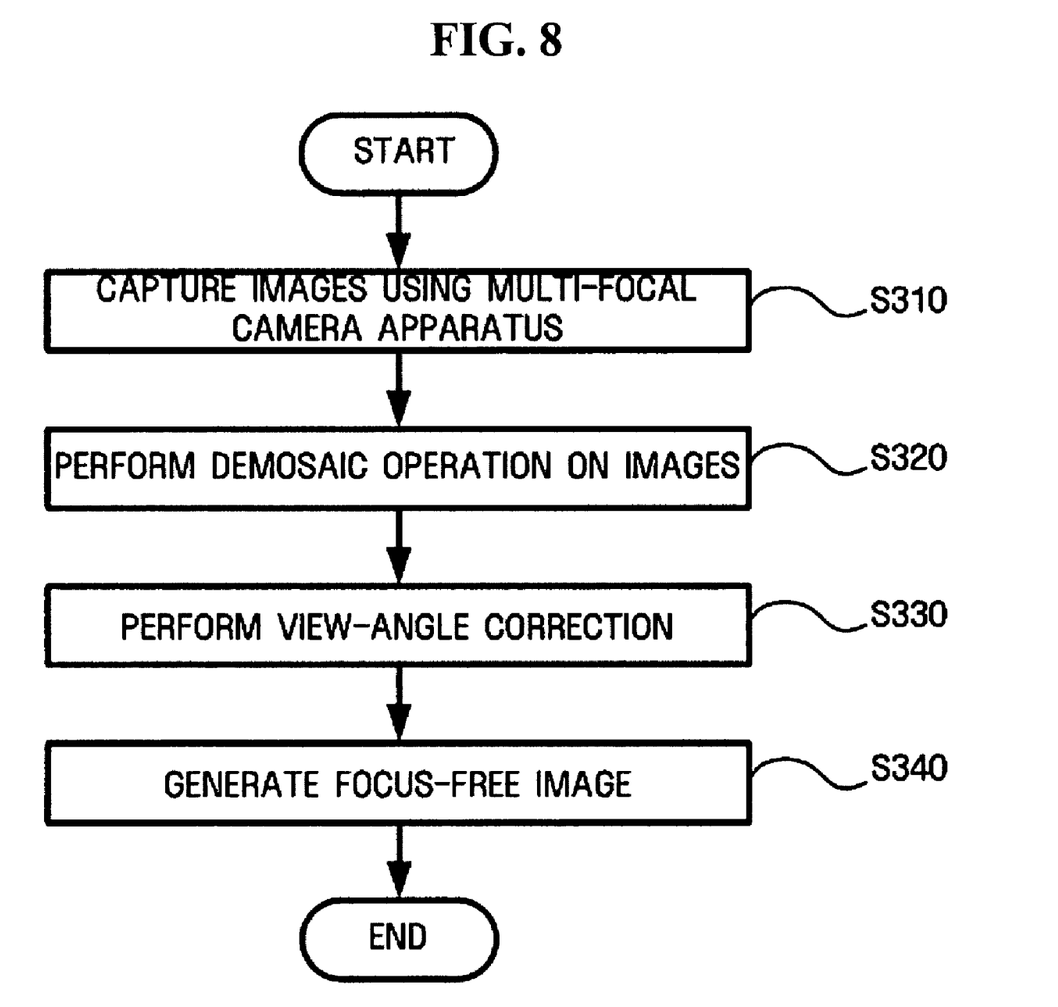
FIG. 8 is a flowchart illustrating a method of generating a focus-free image using a multi-focal camera apparatus according to an exemplary embodiment of the present invention.
Figure 9:
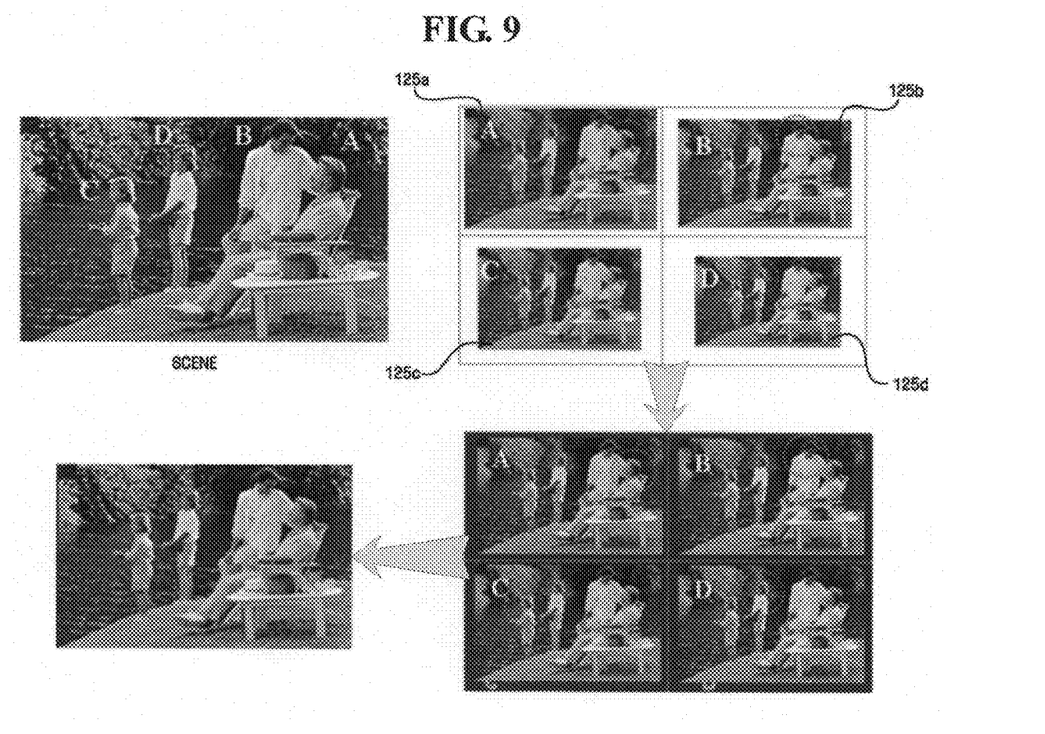
FIG. 9 is a diagram for explaining the method illustrated in FIG. 8.

FIG. 8 is a flowchart illustrating a method of generating a focus-free image using a multi-focal camera apparatus according to an exemplary embodiment of the present invention, and FIG. 9 is a diagram for explaining the method illustrated in FIG. 8, according to an exemplary embodiment of the present invention.

Referring to FIGS. 8 and 9, in operation S310, the image-sensor module 120 obtains a plurality of images 125a through 125d by performing a photographing operation with the use of the multi-focal camera apparatus illustrated in FIG. 1. The images 125a through 125d are obtained by focusing a plurality of lenses 115a through 115d on different locations.

In operation S320, a demosaic operation is performed on the images 125a through 125d obtained by the image-sensor module 120. The demosaic operation converts a captured pixel value into a precise pixel value that can better represent an actual color.

Thereafter, in operation S330, the view-angle-correction module 130 performs view-angle correction on the images 125a through 125d so that the images 125a through 125d have the same size. Referring to FIG. 9, the images 125a through 125d initially have different sizes. View-angle correction may be performed on the images 125a, 125c, and 125d by referencing the image 125b, which is an image captured using the reference lens 115b. As a result of the view-angle correction, the images 125a through 125d have the same size. In other words, a plurality of images obtained by the view-angle correction have the same view angle and focus on different objects or locations.

Thereafter, in operation S340, the focus-free image generation module 140 extracts image portions with optimum sharpness from a plurality of images obtained by the view-angle correction performed in operation S330, and merges the extracted image portions, thereby generating a focus-free image with high sharpness.

According to an exemplary embodiment, a high pass filter may be used to detect image portions with optimum sharpness from the images obtained by the view-angle correction performed in operation S330 on a pixel-by-pixel basis.

Alternatively, the images obtained by the view-angle correction performed in operation S330 are compared with one another on a pixel-by-pixel basis, and then pixels with the highest sharpness may be selected from the corresponding images.

A method of generating an autofocus image using a multi-focal camera apparatus according to an exemplary embodiment of the present invention will hereinafter be described in detail with reference to FIGS. 10 and 11.

Figure 10:
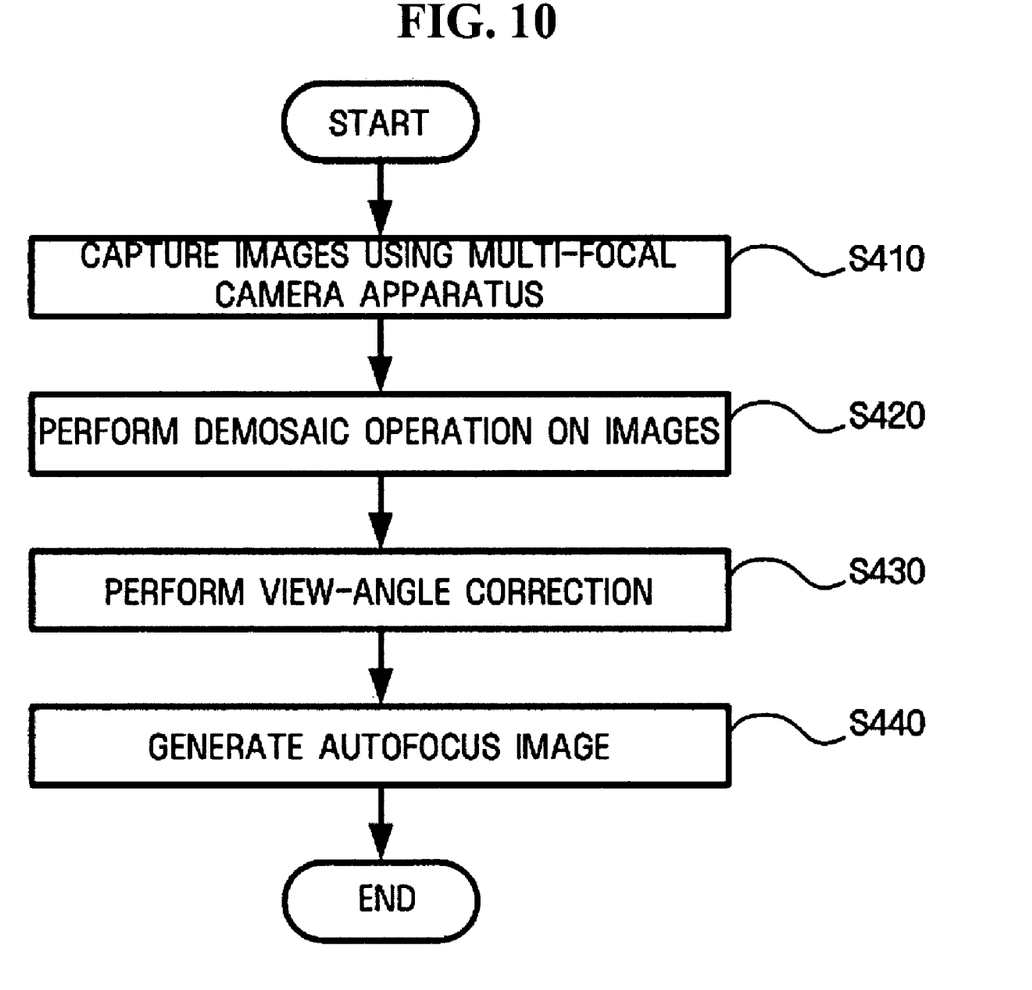
FIG. 10 is a flowchart illustrating a method of generating an autofocus image using a multi-focal camera apparatus according to an exemplary embodiment of the present invention.
Figure 11:
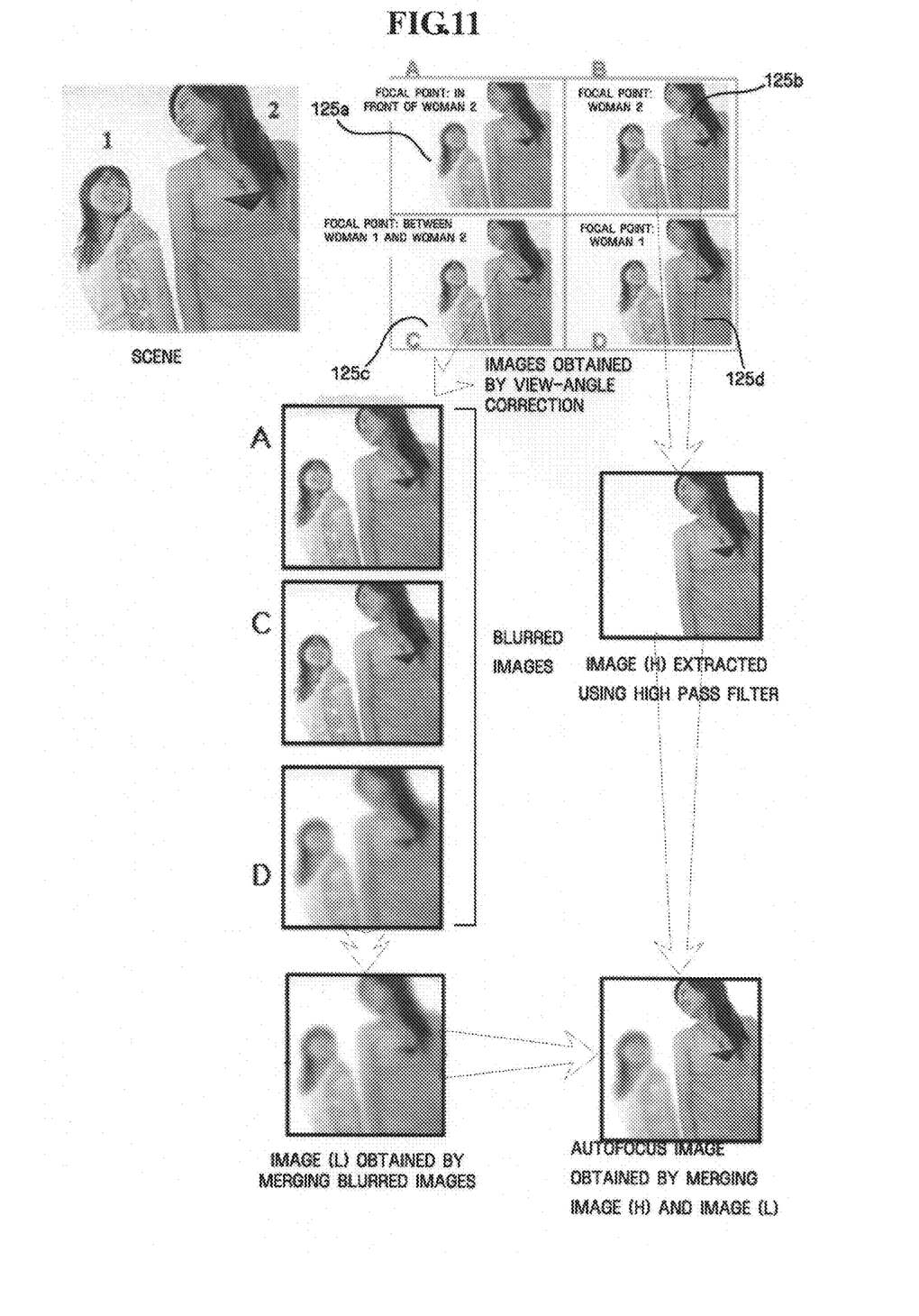
FIG. 11 is a diagram for explaining the method illustrated in FIG. 10.

FIG. 10 is a flowchart illustrating a method of generating an autofocus image using a multi-focal camera apparatus according to an exemplary embodiment of the present invention, and FIG. 11 is a diagram for explaining the method illustrated in FIG. 10, according to an exemplary embodiment of the present invention.

Referring to FIGS. 10 and 11, in operation S410, the image-sensor module 120 obtains a plurality of images 125a through 125d by performing a photographing operation with the use of the multi-focal camera apparatus illustrated in FIG. 1. The images 125a through 125d are obtained by focusing a plurality of lenses 115a through 115d on different locations. Referring to FIG. 11, an image of two women (i.e., woman 1 and woman 2) is captured using a multi-focal camera apparatus which includes four lenses having different object distances, i.e., lenses A through B (115a through 115d). In detail, a photographing operation is performed by using lens B (115b) as a reference lens and focusing lens B (115b) on woman 2. Referring to FIG. 11, woman 1 is more distant from the multi-focal camera apparatus than woman 2.

Thereafter, in operation S420, a demosaic operation is performed on the images 125a through 125d obtained by the image-sensor module 120. The demosaic operation is an operation that converts a captured pixel value into a precise pixel value that can better represent an actual color.

Thereafter, in operation S430, the view-angle-correction module 130 performs view-angle correction on the images 125a through 125d so that the images 125a through 125d have the same size. FIG. 11 presents a plurality of images obtained by performing view-angle correction on the images 125a, 125c, and 125d with reference to the image 125b, which is an image captured using lens B (115b) so that the images 125a through 125d have the same size.

The images obtained by the view-angle correction performed in operation S430 have the same view angle and focus on different locations or objects. In detail, lens A (115a) is focused on a location that is less distant than woman 2 from the multi-focal camera apparatus, lens B (115b) is focused on woman 2, lens C (115c) is focused between woman 1 and woman 2, and lens D (115d) is focused on woman 1. Accordingly, lens B (115b) can render woman 2 with the highest sharpness, compared to lenses A, C, and D (115a, 115c, and 115d).

Thereafter, in operation S440, the autofocus-image-generation module 150 extracts an image portion with optimum sharpness from a predetermined image that is selected among the images obtained by the view-angle correction performed in operation S430, blurs the rest of the images obtained by the view-angle correction performed in operation S430, and merges the extracted image portion and a blurry image obtained by the blurring, thereby generating an autofocus image.

The predetermined image may be an image captured using a reference lens focused on by a user, e.g., the image 125b captured using lens B (115b).

An image portion with optimum sharpness may be extracted from the image 125b captured using lens B (115b). Referring to FIG. 11, an image H is obtained by extracting an image portion that renders woman 2 from the image 125b using a high pass filter.

Thereafter, the images 125a, 125c, and 125d captured using lenses A (115a), C (115c), and D (115d), respectively, are blurred using a low pass filter. In this case, given that the focal lengths of lenses A and C (115a and 115c) are more similar than the focal length of lens D (115d) to the focal length of lens B, a low pass filter with a relatively small weight may be applied to the images 125a and 125c captured using lenses A and C (115a and 115c), respectively, whereas a low pass filter with a relatively large weight may be applied to the image 125d captured using lens D (115d). Accordingly, the images 125a and 125c are less blurred than the image 125d, as illustrated in FIG. 11. As a result, an object or a location that is distant from woman 2 is blurred further, and is thus rendered blurrier than an object or a location that is less distant from woman 2.

Thereafter, the blurred images are merged by, for example, averaging the blurred images on a pixel-by-pixel basis. As a result, an image L is obtained, as illustrated in FIG. 11.

Thereafter, the image H and the image L are merged, thereby obtaining an autofocus image. Image L may fill portions that are not rendered in image H. In other words, image H may be laid over image L.

As a result, an autofocus image in which woman 2 focused on by the user is rendered with the highest sharpness and a location or object that is more distant from woman 2 is rendered blurrier than a location or object that is less distant from woman 2 is obtained.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of the present invention, or they may be of the kind well-known and available to those skilled in the art of computer hardware and/or computer software.

As described above, the multi-focal camera apparatus and the methods and mediums for generating a focus-free image and an autofocus image using a multi-focal camera apparatus according to the present invention have the following advantages.

First, it is possible to expand DOF by capturing a plurality of images having different focal points through one photographing operation.

Second, it is possible to easily realize a focus-free imaging function, which is one of the features of high-end cameras.

Third, it is possible to easily realize an autofocus imaging function, which is one of the features of high-end cameras.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A multi-focal camera apparatus comprising:
   a lens module which comprises a plurality of lenses that concentrate light incident thereupon;
   an image-sensor module which comprises a plurality of sensing zones respectively corresponding to the lenses, and which obtains a plurality of images by converting beams of incident light transmitted through the lenses into electrical signals using the sensing zones,
   wherein the lenses have the same optical properties and are different distances apart from the respective sensing zones; and
   an autofocus-image-generation module which generates an autofocus image by extracting an image portion with optimum sharpness from a predetermined image that is chosen among the images, blurring the images excluding the predetermined image, and merging a blurry image obtained by the blurring and the extracted image portion,
   wherein the autofocus-image-generation module obtains the blurry image by blurring all the images except the predetermined image, averaging the blurred images, and merging the results of the averaging, and
   wherein a low pass filter applies a smaller weight to an image captured using a lens whose object side focus distance is closer than that of the lens used to produce the predetermined image.

2. The multi-focal camera apparatus of claim 1, wherein the lenses are arranged in a checkerboard pattern.

3. The multi-focal camera apparatus of claim 1, wherein the lenses move back and forth along with one another.

4. The multi-focal camera apparatus of claim 1, wherein photographing is performed using one of the lenses as a reference lens.

5. The multi-focal camera apparatus of claim 1, wherein the optical properties of the lenses comprise focal lengths.

6. The multi-focal camera apparatus of claim 1, further comprising a view-angle-correction module which corrects the images so that the images have the same size.

7. The multi-focal camera apparatus of claim 1, wherein the autofocus-image-generation module detects and extracts the image portion with optimum sharpness from the predetermined image, captured by focusing the reference lens, by applying a high pass filter to the image.

8. The multi-focal camera apparatus as recited in claim 1, wherein the multi-focal camera apparatus is part of a mobile camera phone.

9. The multi-focal camera apparatus as recited in claim 1, wherein the multi-focal camera apparatus is part of a personal digital assistant.

* * * * *